Rec'd Oct 24/57

130 THRASHING.
Grain Separators.
B. Shaking Screens.

Original Patented April 20. 1852.

Additional Imp^t Patented Dec. 15. 1857.

No. 181.

Diagram F

Diagram K.

Diagram M.

Thomas J. Doyles

Additional Improvements

In Winnowers or Grain Cleaners.

2 Sheets—Sheet 2.
T. J. DOYLE.
Grain Winnower.
No. 181.
A. I. Patented Dec. 15, 1857.
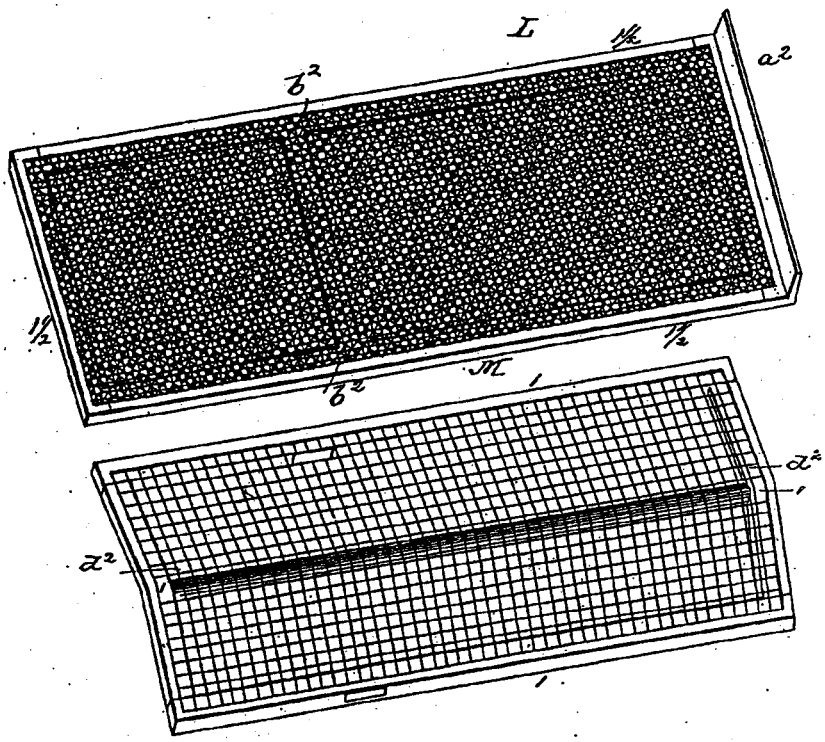
N. PETERS, Photo-Lithographer, Washington, D. C.

DEPARTMENT OF COMMERCE
UNITED STATES PATENT AND TRADEMARK OFFICE

---

MISSING PAGE(S)

PATENT NUMBER AI 181 FOR THE ISSUE DATE 12/15/1857 HAS BEEN SCANNED/LOADED, BUT WITH MISSING PAGES(S). UPON RECEIPT OF THE MISSING PAGE(S), THE ENTIRE DOCUMENT WILL BE RESCANNED.

THIS NOTICE IS FOR THE MISSING PAGE(S) CONTAINING:

All Text / Claims